3,300,532
N-(β-DIETHYLAMINO ETHYL)-N-[β-HYDROXY-β-(PHENYL) ETHYL] ANILINES AND SALTS THEREOF
Hugo Zellner, Linz (Danube), Austria, assignor to Donau-Pharmazie Gesellschaft m.b.H., Linz (Danube), Austria, a corporation of Austria
No Drawing. Filed Mar. 29, 1965, Ser. No. 443,707
Claims priority, application Austria, June 26, 1959, A 4,719/59
4 Claims. (Cl. 260—570.5)

The present application is a continuation-in-part of copending application Serial No. 38,127, filed June 23, 1960, now abandoned, and entitled, Valuable Tertiary Aniline Compounds, and Process of Making Same.

The present invention relates to novel aniline derivatives and more particularly to novel tertiary aniline derivatives, and to methods of preparing same.

It is one object of the present invention to provide new and valuable aniline compounds which are characterized by their valuable pharmacological properties.

Another object of the present invention is to provide simple and effective methods of producing such new and valuable aniline compounds.

A further object of the present invention is to provide new and valuable pharmaceutical compositions useful in therapy.

Still another object of the present invention is to provide a method of relieving pain and inducing sleep, thereby having a respiration stimulating effect.

Still another object of the present invention is to provide a method of causing local anesthesia and retarding blood coagulation.

Other objects of the present invention and advantageous features thereof will become apparent as the description proceeds.

Compounds according to the present invention which have an analgesic effect without any inhibiting effect upon respiration and the autonomic nervous system are aniline compounds of Formula I

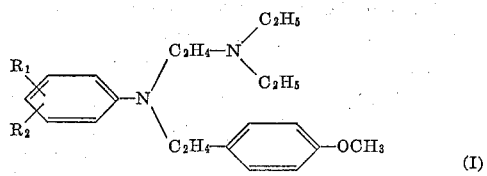

(I)

wherein $R_1$ and $R_2$ are hydrogen and/or methoxy, at least one of said $R_1$ and $R_2$ being methoxy.

Another group of compounds according to the present invention are aniline compounds of Formula II

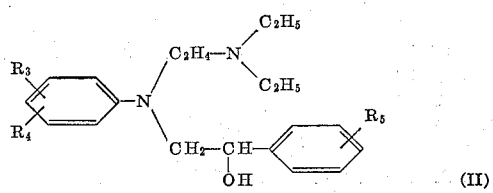

(II)

wherein $R_3$ and $R_4$ are hydrogen, halogen, especially chlorine, and/or methoxy; while
$R_5$ is hydrogen or methoxy.

These aniline compounds of Formula II are also therapeutically effective compounds which exhibit local anesthetic activity and retard blood coagulation.

Several methods are available for synthesizing the novel aniline compounds of the present invention.

Reduction of substituted anilides of the following Formula III

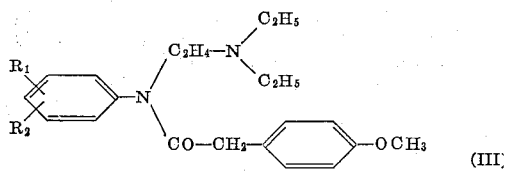

(III)

or respectively, of substituted anilides of Formula IV

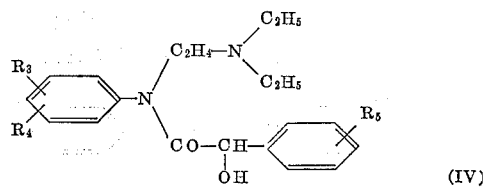

(IV)

in which formulas $R_1$, $R_2$, $R_3$, $R_4$, and $R_5$ represent the same substituents as indicated above, by means of metal hydrides such as lithium aluminum hydride, alkali metal or alkaline earth metal hydrides, and the like yields the substituted anilines of Formulas I or II. Thereby, the acyl radical is readily reduced to the methylene radical. This is surprising since it is well known that reduction of benzoyl amides causes splitting up of the molecule and formation of the secondary amine and of a benzyl alcohol (see Laszlo Szabo, "Mag. kem. Foly," vol. 61 (1955), page 338).

When operating according to Szabo and using the stoichiometric amount of lithium aluminum hydride or a slight excess thereof (up to 30%) and employing solutions or suspensions of said reducing agent in ether or tetrahydrofuran, the method is useful for the preparation of the cleavage products, i.e., the secondary amine and the benzyl alcohol. Substantially no tertiary amine is formed.

Therefore, in order to avoid such cleavage, strongly reducing conditions are employed. Such conditions are characterized, for instance, by using a large excess of reducing agent and a solvent of a higher boiling point, preferably dioxane. This method has the additional advantage that lithium aluminum hydride is only very slightly soluble in dioxane at room temperature. Its solubility therein is increased to the required amount at an elevated temperature of about 70° C. As a result thereof the reaction sets in only at such a high temperature and proceeds very rapidly so that reductive cleavage of the amine is avoided.

The tertiary aniline compounds according to the present invention can also be obtained by a reductive treatment of secondary anilides of the following Formula V.

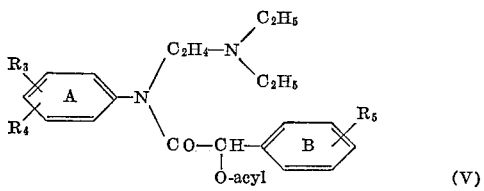

wherein

R₃, R₄, and R₅ represent the same substituents as indicated above, while acyl indicates a carboxylic acid group.

Such secondary anilines thus are acylated with O-acylated mandelic acids which may be substituted in their phenyl ring. Reducing agents cause simultaneous reduction of the carbonyl group of the starting mandelic acid anilide and splitting off of the acyl group protecting the hydroxyl group of the mandeloyl group. The resulting compound is a tertiary aniline compound having a hydroxyl group in the aliphatic portion of the aralkyl substituent adjacent the benzene ring B.

Compounds of Formula II can also be obtained by introducing the missing substituent either in dialkylamino alkyl anilines of Formula VI

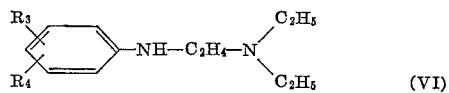

or, respectively, in phenyl anilines of Formula VII

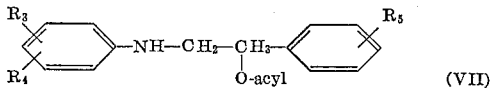

For this purpose, the dialkylamino alkyl aniline compounds of Formula VI are, for instance, reacted with phenyl ethylene oxide having a methoxy group in the phenyl ring.

In compounds of Formula VII, the dialkylamino alkyl radical may be introduced by any one of the known methods. The last mentioned process is preferably employed when reduction of the acylated secondary aniline would cause cleavage of the molecule and reconversion into the starting secondary amine.

The secondary aniline compounds of Formula VII are also obtained by reduction of aralkoyl anilides of the following Formula VIII

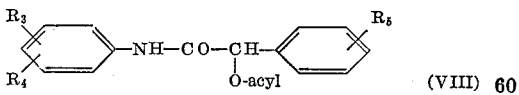

by means of metal hydrides.

R₃, R₄, R₅, and acyl in said Formulas VI, VII, and VIII represent the above indicated substituents.

The dialkylamino alkyl group is introduced in compounds of Formula VII by reacting such compounds with reactive derivatives of dialkylamino alcohols, such as their halides, and particularly their chlorides. Condensing agents such as sodium amide, sodium alcoholate, potassium carbonate, or alkali metal hydroxides are preferably employed in conjunction with the dialkylamino alkyl halides.

The following examples are further illustrative of the method of the present invention, and it will be understood that the invention is not limited thereto.

EXAMPLE 1

N-(β-diethylamino ethyl)-N-[β-(p-methoxy phenyl) ethyl]-p-anisidine

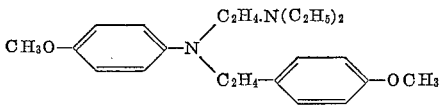

78 g. of N-(β-diethylamino ethyl)-N-(p-methoxy phenyl acetyl)-p-methoxy aniline are dissolved in 200 cc. of dioxane and the solution is added to a slurry of 8.5 g. of lithium aluminum hydride (210% of the stoichiometric amount of 4.0 g.) in 50 cc. of dioxane with vigorous stirring. A strong reaction sets in after a few minutes and is permitted to subside. The resulting reaction mixture is then heated with stirring on a water bath for two hours, and is cooled. A mixture of 20 cc. of dioxane and 20 cc. of water is cautiously added to destroy the excess of reducing agent. 700 cc. of a sodium hydroxide solution are then added and the mixture is stirred. Such an amount of solid potassium hydroxide is added that the dioxane separates from the aqueous phase and forms a supernatant layer. Approximately 100 g. of potassium hydroxide are required. The dioxane layer is separated from the aqueous alkaline layer which is extracted three times by shaking with dioxane and is then discarded. The combined dioxane solutions are dried over sodium sulfate and the dioxane is distilled off. The residue is fractionated by distillation in a vacuum. The tertiary amine is obtained as a colorless oil having a boiling point of 196° C./1 mm. Hg, and a refractive index of $n_D =$ 1.558. The yield is 54 g.

A lower boiling fraction of 22.5 g. of N-(β-diethylamino ethyl)-p-anisidine is recovered. Careful fractionation also yields a small amount of p-methoxy phenyl ethanol which is another cleavage product of the tertiary amine.

While lithium aluminum hydride is the preferred reducing agent because of the convenience with which it can be handled, of its ready availability, and of the simple manner in which its oxidation products may be disposed of, it will be understood by those skilled in this art, that other metal hydrides in equivalent amounts may be substituted therefor in the aforedescribed reaction without basic changes in the reaction mechanism. More specifically, the hydrides of the alkali metals and of the alkaline earth metals, such as sodium hydride, potassium hydride, calcium hydride, and barium hydride when employed in the method of the present invention in at least stoichiometric amounts produce also the desired aniline derivatives.

EXAMPLE 2

N-(β-diethylamino ethyl)-N-(β-hydroxy ethyl) p-anisidine

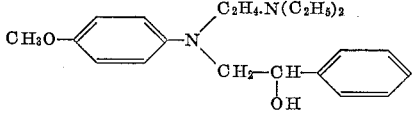

A slurry of 18.5 g. of lithium aluminum hydride (195% of the stoichiometric amount of 9.5 g.) in 100 cc. of dioxane is prepared and a solution of 99 g. of N-(β-diethylamino ethyl)-N-(acetyl phenyl glycolyl)-p-methoxy aniline in 250 cc. of dioxane is rapidly added thereto while stirring vigorously. It is necessary to employ a rather large flask to contain the violent reaction which sets in after about 5 minutes. After the reaction calms down, the mixture is heated on a water bath for one hour while it is being stirred. It is then cooled and the excess of lithium aluminum hydride is decomposed by the addition of water. The hydroxides of lithium and aluminum are dissolved by the addition of 1.5 l. of water, 250 g. of potassium hydroxide, and 100 g. of sodium hydroxide.

A dioxane layer separates from an aqueous alkaline layer and is removed. The alkaline solution is extracted three times with dioxane by shaking. The combined dioxane solutions are dried over sodium sulfate and the dioxane is distilled off.

The residue is distilled in a vacuum. The distillation step is twice repeated. The desired tertiary amine is obtained as a viscous colorless oil. Boiling point: 195–196° C./1 mm. Hg. Upon standing for some time at 50° C., the entire oily mass crystallizes. The crystals are recrystallized from isopropanol and have a melting point of 90° C. The yield is 64.5 g.

EXAMPLE 3

N-(β-diethylamino ethyl)-N-(β-phenyl-β-hydroxy ethyl)-2,5-dichloro aniline

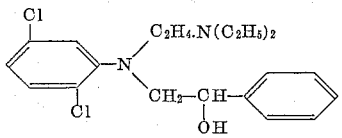

90 g. of N-(β-diethylamino ethyl)-N-(acetyl phenyl glycolyl)-2,5-dichloro aniline of the formula

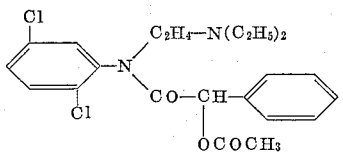

are dissolved in 100 cc. of dioxane and the solution is rapidly added to a slurry of 11.5 g. of lithium aluminum hydride (150% of the stoichiometric amount of 7.6 g.) in 150 cc. of dioxane. A vigorous reaction sets in after about ten minutes and is permitted to run its course. The reaction mixture is then heated on a boiling water bath for one hour. It is cooled and the excess of lithium aluminum hydride is decomposed by the addition of a mixture of dioxane and water (5:1). The resulting hydroxides of lithium and aluminum are dissolved by the addition of a solution of 350 g. of potassium hydroxide in one liter of water. A dioxane phase is formed as a layer floating on the aqueous alkaline layer. It is separated from the aqueous solution, and the latter is extracted consecutively with three batches of dioxane. The combined dioxane solutions are dried over sodium sulfate and the solvent is evaporated. The residue is twice subjected to distillation in a vacuum, and 65 g. of the tertiary amine are obtained as a colorless oil having a boiling point of 184–185° C./1 mm. Hg. The oil readily forms a crystalline mass. After recrystallization from isopropanol, the pure amine is obtained in the form of hard white crystals having a melting point of 96–97° C.

EXAMPLE 4

N-(β-diethylamino ethyl)-N-(β-phenyl-β-hydroxy ethyl)-p-anisidine 111 g. of N-(β-diethylamino ethyl)-p-anisidine are mixed with 62 g. of epoxy ethyl benzene (styrene oxide) of the formula

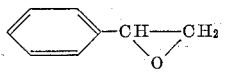

The mixture is kept in an oven at 50° C. for seven days. Almost the entire material is transformed into crystals which are separated from an oily constituent by filtration under suction and pressing off the oil. The crystals are triturated with a small amount of isopropanol and squeezed to remove the liquid. The crystals are twice recrystallized from isopropanol. The amine is obtained in the form of white crystals having a melting point of 89–90° C. The yield is 93 g.

The crude amine after the first pressing may directly be purified by vacuum distillation. It has a boiling point of 194–197° C./1 mm. Hg.

The oily fraction can be worked up to recover a small amount of the isomeric N-(β-diethylamino ethyl)-N-(α phenyl-β-hydroxy ethyl)-p-anisidine which is formed as by-product.

EXAMPLE 5

N-(β-diethylamino ethyl)-N-[β-(p-methoxy phenyl)-β-hydroxy ethyl]-p-anisidine

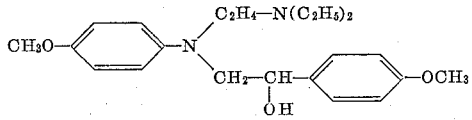

74 g. of p-methoxy styrene oxide are mixed with 83.5 g of N-(β-diethylamino ethyl)-p-anisidine and the mixtur is allowed to stand at room temperature for 12 hours. I is then heated for 4 hours to a temperature of 150° C. ii a flask equipped with a reflux condenser, and the produc is stored at room temperature for an additional period o one week. The resulting mixture is distilled in a vacuun and the following fractions are collected separately:

(1) *Low boiling fraction.*—Distilling at a tempera ture up to 140° C./1 mm. Hg. After repeated distillation 40 g. of the starting material, N-(β-diethylamino ethyl) p-anisidine, are recovered and identified by the refractiv index: $n_D = 1.530$.

(2) *Intermediate fraction.*—The distillation tempera ture rapidly rises from 140° to 200° C./1 mm. Hg. 54 g of a colorless oily mixture having a refractive index $n_D = 1.564$ are obtained.

(3) *Main fraction.*—Boiling range: 200° C. to 245' C./1 mm. Hg, largely distilling at 230° C./1 mm. Hg Viscous, reddish oil; $n_D = 1.558$. The yield is 76 g.

The main fraction is twice redistilled in a vacuum The last distillation yields 72 g. of a light yellow oil boil ing between 200° C. and 205° C./0.1 mm. Hg; $n_D = 1.558$ Further amounts of the starting N-(β-diethylamin ethyl)-p-anisidine are recovered by working up the inter mediate fraction so that the yield of the desired tertiar amine calculated for reacted starting material is 83% o the theoretical yield.

EXAMPLE 6

N-(β-diethylamino ethyl)-N-[β-(p-methoxy phenyl)-β-hydroxy ethyl]-p-anisidine 42.8 g. of p-methoxy acetyl mandeloyl-N-(β-diethyl amino ethyl)-p-methoxy anilide of the formula

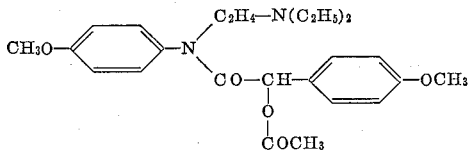

are dissolved in 200 cc. of anhydrous dioxane and ; slurry of 8.5 g. of lithium aluminum hydride in 50 cc. o dioxane is added at once thereto. The mixture is vigor ously stirred while it is heated on a water bath in a flasl equipped with a reflux condenser. A violent reactioi sets in after a short delay. The reaction subsides, anc the mixture is heated for two more hours after the en of the visible reaction.

The excess of lithium aluminum hydride is decompose by cautious addition of a mixture of dioxane and wate (5:1). After completion of the decomposition reaction 700 cc. of a 20% sodium hydroxide solution are added Sufficient solid potassium hydroxide is added with agita tion to separate the dioxane from the aqueous alkalin solution as a supernatant separate layer, which is re moved from the aqueous phase. The latter is extracted hree times by shaking with ether, and the combined di-
oxane and ether solutions are dried over sodium sulfate.
The solvents are evaporated and the residue is subjected
hree times to vacuum distillation. 30.5 g. of a reddish
yellow oil, $n_D=1.558$, boiling at 200–203° C./0.1 mm.
Hg are obtained. The resulting compound is identical
with that obtained in Example 5.

EXAMPLE 7

N-(β-diethylamino ethyl)-N-[β-(p-methoxy phenyl) ethyl]-o-anisidine

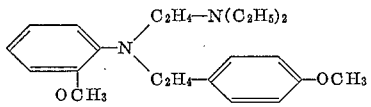

124 g. of β-(p-methoxy phenyl) ethylchloride and 165
g. of N-(β-diethylamino ethyl)-o-anisidine are jointly
dissolved in a mixture of 80 cc. of toluene and 170 cc.
of xylene. 34 g. of sodium amide are added. The mix-
ture is vigorously stirred and its temperature rises spon-
taneously after a short period of time. Stirring is con-
tinued for eight hours, and the mixture is then left to
stand for two days, whereupon it is refluxed for one hour.
After preliminary cooling, the mixture is poured into ice
water; the solvent layer is separated from the aqueous
phase and is dried over potassium carbonate. The sol-
vent is evaporated, and the residue is fractionated by dis-
tillation in a vacuum. The following fractions are sepa-
rately collected:

1) Low boiling fraction: up to 105° C./1 mm. Hg;
2) Intermediate fraction: 105–125° C./0.3 mm. Hg;
3) High intermediate fraction: 125–180° C./0.3 mm. Hg;
4) Main fraction: 188° C./0.1 mm. Hg.

The third and fourth fractions are combined and re-
peatedly redistilled to obtain a uniform fraction having
boiling temperature of 188–191° C./0.1 mm. Hg. The
free base obtained is dissolved in an excess of hydro-
chloric acid, set free from said solution by the addition
of potassium hydroxide, extracted from the aqueous
solution by means of ethylene dichloride, again trans-
ferred to an aqueous solution of 1:1 hydrochloric acid,
set free by the addition of ammonia, and again extracted
by means of ethylene dichloride. After evaporation of
the solvent, the base is distilled over metallic sodium.
It is recovered in purified condition as a light yellow
oil of the boiling point 178° C./0.05 mm. Hg; $n_D=1.552$.

Taking into consideration the N-(β-diethylamino
ethyl)-o-anisidine recovered from the intermediate sec-
ond fraction, the yield is 74% of the theoretical yield.

Other condensing agents may be substituted for sodium
amide in the afore-described reaction without changing
its course and without materially altering the yields ob-
tained. Although sodium amide is preferred for practi-
cal reasons, it may be replaced by sodium alcoholate, po-
tassium carbonate, or the hydroxide of the alkali metals,
such as sodium or potassium hydroxide.

EXAMPLE 8

N-(β-diethylamino ethyl)-N-[β-(p-methoxy phenyl) ethyl]-o-anisidine 137 g. of N-[β-(p-methoxy phenyl) ethyl]-o-anisidine
and 80 g. of β-diethylamino ethylchloride are dissolved
in 200 cc. of xylene. A suspension of 24 g. of sodium
amide in 100 cc. of toluene is added to said mixture which
is stirred for one day at room temperature, and left to
stand for another day. It is then heated to boiling, where-
upon a dense slurry of crystals forms which regains its
fluidity after heating for about 30 minutes. The mixture
is cooled and poured into ice water. The floating solvent
layer is separated, dried over potassium carbonate, and
distilled in a vacuum after evaporation of the solvent.
Three separate fractions are collected:
(1) Low boiling fraction: up to 140° C.;
(2) Intermediate fraction: 160–180° C./0.3 mm. Hg;
(3) High boiling fraction: 185–188° C./0.1 mm. Hg.

40 g. of a 30% suspension of sodium amide in toluene,
40 g. of β-diethylamino ethylchloride, and 100 cc. of
xylene are added to the first fraction, and the mixture is
refluxed for ten hours. It is then cooled and worked up
as above, whereby three fractions are obtained:
(1) Low boiling fraction: up to 140° C./1 mm. Hg;
(2) Intermediate fraction: 102–178° C./0.3 mm. Hg;
(3) High boiling fraction: 178–198° C./0.1 mm. Hg.

The combined high boiling fractions are dissolved in
dichloro ethylene and the solution is shaken with aqueous
1:1 hydrochloric acid. The base is set free from the
acid solution by means of ammonia and is again dis-
solved in dichloro ethylene. The solvent layer is sep-
arated from the aqueous layer and the solvent is evap-
orated. The residue is distilled in a vacuum and the
fraction obtained at 162–175° C./0.05 mm. Hg is re-
peatedly redistilled over a fractionating column.
The purified base is obtained as a light yellow oil of
the boiling point: 177–178° C./0.05 mm. Hg; $n_D=1.552$.

EXAMPLE 9

N-(β-diethylamino ethyl)-N-[β-(p-methoxy phenyl) ethyl]-o-anisidine 273 g. of N-(β-diethylamino ethyl)-N-(p-methoxy
phenyl acetyl)-o-methoxy aniline are dissolved in 500 cc.
of tetrahydrofuran. A suspension of 27 g. of lithium
aluminum hydride in 500 cc. of tetrahydrofuran is slowly
added thereto. The ensuing reaction is permitted to sub-
side and the reaction mixture is refluxed for 30 minutes.
3 g. of lithium aluminum hydride are added to ensure
completion of the reaction. 40 cc. of water, 40 cc. of a
15% sodium hydroxide solution, and 120 cc. of addi-
tional water are consecutively added in small amounts
while the reaction mixture is being cooled. The lithium
aluminum hydride is decomposed thereby and the hy-
droxides of lithium and aluminum are precipitated in
granular form by heating the mixture for 20 minutes.
The solution is filtered and evaporated by heating on a
boiling water bath. The residue is taken up in dichloro
ethylene and extracted from the solvent by shaking with
aqueous 1:1 hydrochloric acid. The base is set free by
the addition of ammonia and is again taken up in di-
chloro ethylene. The solvent is dried over potassium
carbonate and evaporated. The residue is distilled in a
vacuum. The fraction boiling at 188–191° C./0.1 mm.
Hg is twice redistilled. The base is obtained as a light
yellow oil having a boiling point of 178° C./0.05 mm.
Hg; $n_D=1.552$. The yield is 55%.

EXAMPLE 10

N-(β-diethylamino ethyl)-N-[β-(p-methoxy phenyl) ethyl]-2,4-dimethoxy aniline.

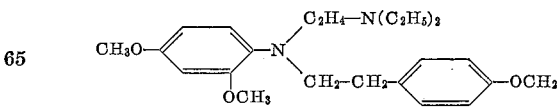

N-(p-methoxy phenyl acetyl)-N-(β-diethylamino ethyl)-2,4-dimethoxy anilide of the formula

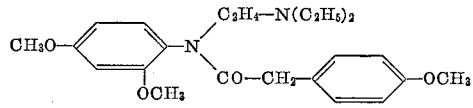

is obtained by reacting 2,4-dimethoxy aniline with β-diethylamino ethylchloride in xylene with the addition of potassium carbonate followed by acylation by means of p-methoxy phenyl acetylchloride. This reaction proceeds according to the following equation:

| Ex. | Compound | B.p. |
|---|---|---|
| 11 | N-(β-diethylamino ethyl)-N-[β-(p-methoxy phenyl) ethyl]-2,5-dimethoxy aniline. | 200–210° C./0.05 mm.Hg. |
| 12 | N-(β-diethylamino ethyl)-N-[β-(p-methoxy phenyl) ethyl]-m-anisidine. | 195–200° C./0.001 mm.Hg. |

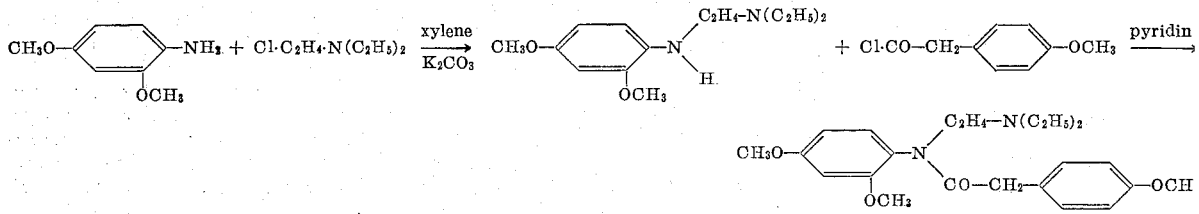

38.6 g. of said p-methoxy phenyl acetyl-N-(β-diethylamino ethyl)-2,4-dimethoxy anilide of the above given formula are dissolved in 100 cc. of dioxane. The resulting solution is rapidly added to a suspension of 5 g. of finely pulverized lithium aluminum hydride in 200 cc. of absolute dioxane while stirring vigorously. Violent reaction with foaming sets in after a short period of time. As soon as said reaction subsides, the mixture is stirred on the water bath for one hour. After cooling, excess lithium aluminum hydride is decomposed by the successive addition of 15 cc. of a 15% sodium hydroxide solution, 15 cc. of water, and again 15 cc. of said sodium hydroxide solution, while stirring. The precipitated granular lithium hydroxide and aluminum hydroxide are filtered off by suction and are washed repeatedly with fresh dioxane. The combined dioxane solutions are thoroughly shaken with 40% sodium hydroxide solution. The supernatant dioxane layer is separated from the aqueous alkaline layer and is dried over solid potassium hydroxide. The dioxane is then distilled off and the residue is distilled by using a fractionating column. The distillate is a viscous oil which is dissolved in hydrochloric acid 1:4. Ammonia is added to the acid solution to render the same alkaline. The amine set free thereby is extracted by means of dichloro methane. The solvent is then distilled off and the remaining viscous oil is distilled in a vacuum in an air bath from a tube with bulbar enlargements. 25 g. of a viscous, light yellow oil of the boiling point 170–175° C./0.3 mm. Hg are obtained thereby. The distillation temperature was measured in the air bath used for heating the bulb tube.

Of course, other secondary amines than those used in the preceding examples may be employed, for instance, the N-(β-diethylamino ethyl)-o-, m-, or p-chloro anilines; 4-iodo aniline; 2,4- or 2,5-dimethoxy anilines; m-methoxy aniline; and others. Otherwise, the reaction proceeds in the same manner as described in Examples 4, 5, 7, and 8.

Acylation of the secondary amines for preparing the acid amides to be reduced to the tertiary amines according to the present invention may be effected with other phenyl acetic acids as mentioned and used in the preceding examples such as o- or m-methoxy phenyl acetic acids or O-acetyl, propionyl, benzoyl, or the like O-substituted mandelic acids substituted by a methoxy group in their benzene ring. Preferably the respective acid chlorides are used for acylation. However, other reactive acid derivatives such as the bromides, anhydrides, mixed anhydrides, or the acids themselves may also be employed. Otherwise, reduction of the resulting acylated secondary amines is carried out by following the procedure described in the preceding examples.

Thus the following compounds of Formula I have been produced in addition to those of Examples 1 and 7 to 10:

Likewise, the following compounds of Formula II have been prepared in addition to those of Examples 2 to 6:

| Ex. | Compound | B.p. |
|---|---|---|
| 13 | N-(β-diethylamino ethyl)-N-(β-hydroxy-β-phenyl ethyl)-4-chloro aniline. | 196° C./0.5 mm. Hg; (M.p. 81° C.) |
| 14 | N-(β-diethylamino ethyl)-N-[β-hydroxy-β-(4-methoxy phenyl) ethyl] aniline. | 200–201° C./0.01 mm.Hg. |
| 15 | N-(β-diethylamino ethyl)-N-[β-hydroxy-β-(4-methoxy phenyl) ethyl]-2,5-dichloro aniline. | 188–190° C./0.1 mm.Hg. |

The tertiary aniline compounds according to the present invention are preferably employed in therapy in the form of their acid addition salts. The free bases may also be administered in tablet or the like form adsorbed to the pharmaceutical excipient.

The acid addition salts are prepared in a manner known per se. The preferred method is illustrated by the following example although the preparation of acid addition salts is by no means limited thereto.

EXAMPE 16

50 g. of N-(β-diethylamino ethyl)-N-[β-(p-methoxy phenyl) ethyl]-p-anisidine prepared by proceeding according to Example 1, are dissolved in 25 cc. of isopropanol. 61 cc. of a 5 N alcoholic hydrochloric acid solution are added thereto while cooling with ice and stirring. The precipitated white needles are recrystallized from isopropanol. The resulting dihydrochloride has a melting point of 178° C.

Other acid addition salts of the tertiary anilines according to the present invention, for instance, with other therapeutically acceptable inorganic acids, such as hydrobromic acid, sulfuric acid, nitric acid, phosphoric acid or with substantially non-toxic, therapeutically acceptable organic acids, such as acetic acid, propionic acid, maleic acid, succinic acid, gloconic acid, malic acid, citric acid, tartaric acid, benzoic acid, salicylic acid, acetyl salicylic acid, phthalic acid, nicotinic acid, isonicotinic acid, furan-2-carboxylic acid, and the like may also be prepared either in solid form or in form of their solutions according to the method described in this example or by other suitable methods.

The preferred and most effective compounds according to Formula I of this invention are the following compounds:

A. N-(β-diethylamino ethyl)-N-[β-(p-methoxy phenyl) ethyl]-p-anisidine according to Example 1;

B. N-(β-diethylamino ethyl)-N-[β-(p-methoxy phenyl) ethyl]-m-anisidine according to Example 12;

while the preferred and most effective compound according to Formula II of this invention is the following compound:

C. N-($\beta$-diethylamino ethyl)-N-($\beta$-hydroxy-$\beta$-phenyl ethyl)-2,5-dichloro aniline of Example 3;

Pharmacological tests were carried out with compounds according to the present invention.

The toxicity of the above mentioned compound was determined on groups of six white mice each with increasing doses. The $LD_{50}$ was calculated by probit analysis 24 hours after administration.

The analgesic effect was determined by placing the test and control animals on a heated metal plate kept constantly at a temperature of 52.7° C. and measuring the reaction time of the animals to the heat stimulus. The following Table I illustrates the results obtained in these tests whereby the analgesic effect $ED_{50}$ and the toxicity $LD_{50}$ were compared with that of morphine hydrochloride:

TABLE I

| Compound | Manner of administration | $LD_{50}$ | $ED_{50}$ | Therapeutic index |
|---|---|---|---|---|
| Morphine HCl | Oral | 580 | 27 | 21.4 |
| A | do | 340 | 80 | 4.25 |
| A | Intraperitoneal | 280 | 46 | 6.1 |
| A | Intravenous | 160 | 22.5 | 7.1 |
| A | Subcutaneous | 400 | 71 | 5.6 |
| B | do | 288 | 40 | 7.2 |
| Example 7 | Oral | | 160 | |
| Example 11 | do | | 250 | |
| Example 10 | do | | 192 | |

The effect of the analgesically most effective compounds A and B upon respiration was tested on rabbits by intravenous administration whereby the respiratory minute volume was measured by the method of Gaddum. The following Table II illustrates the results obtained.

TABLE II

| Compound | Dose administered, mg./kg. | Increase of respiratory minute volume in percent |
|---|---|---|
| A | 1.8 | 70 |
| B | 1.8 | 80 |
| Pentylene tetrazol | 5.0 | 65 |

This respiration stimulating effect is highly advantageous and distinguishes the compounds of Formula I from all other analgesic agents. See, for instance, the standard textbook on "Medicinal Chemistry" by Alfred Burger, 2nd edition, Interscience Publishers, Inc., New York, 1960, page 313, right-hand column, second paragraph, lines 8 to 12, where it is stated that all analgesics "produce respiratory depression which may become a life-threatening phenomenon in especially susceptible individuals (or sometimes from only a slight increase in dose)." This respiration stimulating effect can be observed even when subjecting rabbits to a pretreatment with morphine hydrochloride.

The compounds of Formula I have also a noteworthy spasmolytic effect. For instance, the antihistaminic effect of the above mentioned compound A is as high as that of the highly effective antihistaminic agent pyrilamine while compound B exhibits a spasmolytic activity against spasms caused by barium chloride which is ten times as high as that of papaverine.

Some of the compounds of Formula II have also a substantial analgesic activity, for instance, the compounds of Examples 5 and 13. Other compounds of low analgesic activity and especially the above mentioned compound C have a surprisingly high local anesthetic activity. For instance, the local anesthetic activity tested on the rabbit's eye of an 0.15% solution of the tartrate of compound C is as effective as a 2% solution of cocaine hydrochloride. Due to the low toxicity of the tartrate of said compound C which is about the same as that of cocaine hydrochloride, the therapeutic index of the tartrate of compound C is 58 while that of cocaine hydrochloride is 4.6.

Prolonged block anesthesia is produced by an 0.2% solution of the tartrate of compound C while a 4% solution of cocaine hydrochloride is required to produce the same effect. An 0.4% solution of compound C in tartaric acid causes block anesthesia for almost three hours. When adding 40$\gamma$/cc. of adrenaline to said solution, the amount of compound C can be reduced by 50% to produce the same block anesthesia. It is highly surprising that succinic acid and gluconic acid solutions of compound C are about 200 times as effective in their block anesthetic activity as corresponding amounts of cocaine hydrochloride.

The compounds of Formula II and especially compound C and the compound of Example 5 exhibit a remarkable effect on blood coagulation. They considerably retard or inhibit blood coagulation. Anticoagulant activity of compound C, for instance, is observed when orally or, respectively, intravenously administering 3 mg./ kg. to 6 mg./kg. to rabbits. In vitro said compound C has an anticoagulant activity which evidently affects prothrombin and factor XII. It has also a noteworthy effect on the thrombocytes which lose their ability of forming a solid coagulum as can be shown in the thrombelastogram. Morphological changes of the thrombocytes, however, have not been observed.

The new tertiary anilines and their acid addition salts can be administer orally, parenterally, or in the form of suppositories. Compositions as they are used for the purpose of the present invention comprise, for instance, tablets, pills, dragees, lozenges, and the like shaped preparations. The compounds may also be administered in powder form, preferably enclosed in gelatin and the like capsules. Oral administration in liquid form, such as in the form of emulsions, suspensions, sirups, and the like is also possible. These solid and liquid preparation are produced in a manner known to the art of compounding and processing pharmaceutical products whereby the conventional diluting agents, binding agents, lubricants, expanding agents, and the like excipients, such as lactose, cane sugar, dextrins, starch, talc, kaolin, magnesium hydroxide, magnesium carbonate, pectin, gelatin, agar bentonite, stearic acid, magnesium stearate, and others are employed.

The following examples serve to illustrate such pharmaceutical preparations without, however, limiting the same thereto.

EXAMPLE 17

*Tablets*

|   | G. |
|---|---|
| N - ($\beta$ - diethylamino ethyl) - N - [$\beta$ - (p - methoxy phenyl) ethyl]-p-anisidine | 75 |
| Colloidal silica sold under the trademark 'Aerosil' | 56 |

These two ingredients are intimately mixed with each other and the following substances are admixed thereto:

|   | G. |
|---|---|
| Corn starch | 99 |
| Milk sugar | 120 |
| Magnesium stearate | 2 |
| Gelatin | 1.5 |
| Cocoa butter | 1.5 |

The resulting mixture is compressed to 1000 tablets, each tablet weighing about 355 mg. and containing about 75 mg. of the analgesic tertiary aniline compound.

EXAMPLE 18

*Tablets*

|  | G. |
|---|---|
| Hydrochloride of N-(β-diethylamino ethyl)-N-[β-(p-methoxy phenyl) ethyl]-p-anisidine | 150 | are intimately mixed with

|  | G. |
|---|---|
| Milk sugar | 331 |
| Corn starch | 144 |
| White gelatin | 7 |
| Cocoa butter | 7 |
| Magnesium stearate | 11 |

The mixture is tabletted and yields 1000 tablets, each tablet weighing about 650 mg. and containing about 150 mg. of the analgesic tertiary aniline compound.

EXAMPLE 19

*Dragees*

The tablets obtained according to Example 17 are sugar-coated by rotating in a coating pan with sugar solution. Sugar-coating is repeated until each degree has attained a weight of about 500 mg.

EXAMPLE 20

*Suppositories*

100 g. of the free base N-(β-diethylamino ethyl)-N-[β-(p-methoxy phenyl) ethyl]-p-anisidine are intimately mixed with 100 g. of colloidal silica sold under the trademark "Aerosil." The mixture is incorporated into 3,000 g. of a molten conventional suppository base. 1000 suppositories, each weighing 3.2 g. and containing the free base are obtained.

In place of the free base, there may be employed the hydrochloride whereby the addition of silica can be omitted.

EXAMPLE 21

*Injectable solution*

25 g. of the hydrochloride of N-(β-diethylamino ethyl)-N-[β-(p-methoxy phenyl) ethyl]-p-anisidine are dissolved in 2,200 cc. of bidistilled sterilized water. The solution is filled into ampoules, each ampoule containing 2.2 cc., and the ampoules are sterilized in an autoclave at 120° C.

Injectable solutions can also be prepared by adding the respective base to an aqueous solution of the stoichiometric amount of an acid, for instance, of hydrochloric acid, nitric acid, or of an organic acid such as acetic acid, succinic acid, asorbic acid, gluconic acid, lactic acid, maleic acid, fumaric acid, salicylic acid, and the like.

It should be understood, of course, that the foregoing disclosure relates to only preferred embodiments of the present invention and that it is intended to cover all changes and modifications of the examples of the invention herein chosen for the purpose of the disclosure which do not constitute departures from the spirit and scope of the present invention set forth herein and in the appended claims.

The terms "1:1 hydrochloric acid" or "1:4 hydrochloric acid," respectively, as used hereinabove in the specification, designate concentrated hydrochloric acid diluted with an equal volume of water or, respectively, with four times its volume of water.

I claim:

1. The compound selected from the group consisting of the N-(β-diethylamino ethyl)-N-[β-hydroxy-β-(phenyl) ethyl] aniline compound of the formula

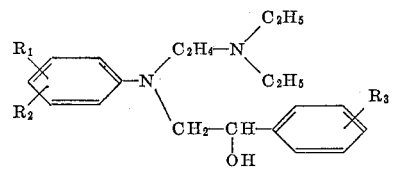

wherein $R_1$ and $R_2$ are members selected from the group consisting of hydrogen, halogen, and methoxy, while $R_3$ is a member selected from the group consisting of hydrogen and methoxy, and their salts with therapeutically acceptable acids.

2. N-(β-diethylamino ethyl)-N-[β-(p-methoxy phenyl)-β-hydroxy ethyl]-p-anisidine.

3. N - (β - diethylamino ethyl)-N-(β-phenyl-β-hydroxy ethyl)-2,5-dichloro aniline.

4. N - (β - diethylamino ethyl)-N-(β-phenyl-β-hydroxy ethyl)-p-anisidine.

References Cited by the Examiner

UNITED STATES PATENTS

| 1,757,394 | 5/1930 | Schulemann et al. | 260—570.5 |
| 2,505,133 | 4/1950 | Miescher et al. | 260—309.6 |
| 2,530,126 | 11/1950 | Kwartler et al. | 260—570.5 |
| 2,975,097 | 3/1961 | Modderno | 167—52 |
| 2,993,831 | 7/1961 | Shapiro | 167—52 |

CHARLES B. PARKER, *Primary Examiner.*

ROBERT V. HINES, *Assistant Examiner.*